United States Patent
Woo et al.

(10) Patent No.: US 11,050,047 B2
(45) Date of Patent: Jun. 29, 2021

(54) METHOD FOR MANUFACTURING SECONDARY BATTERY USING LITHIUM METAL AS NEGATIVE ELECTRODE

(71) Applicant: LG CHEM, LTD., Seoul (KR)

(72) Inventors: Kyung Hwa Woo, Daejeon (KR); Jae Hyun Lee, Sejong (KR); Jong Keon Yoon, Daejeon (KR); Hoe Jin Hah, Daejeon (KR)

(73) Assignee: LG CHEM, LTD., Seoul (KR)

( * ) Notice: Subject to any disclaimer, the term of this patent is extended or adjusted under 35 U.S.C. 154(b) by 63 days.

(21) Appl. No.: 16/344,629

(22) PCT Filed: Jun. 29, 2018

(86) PCT No.: PCT/KR2018/007393
§ 371 (c)(1),
(2) Date: Apr. 24, 2019

(87) PCT Pub. No.: WO2019/013478
PCT Pub. Date: Jan. 17, 2019

(65) Prior Publication Data
US 2020/0067070 A1 Feb. 27, 2020

(30) Foreign Application Priority Data
Jul. 11, 2017 (KR) .................. 10-2017-0087578

(51) Int. Cl.
| | | |
|---|---|---|
| *H01M 4/04* | (2006.01) | |
| *H01M 10/52* | (2006.01) | |
| *H01M 4/1395* | (2010.01) | |
| *H01M 4/38* | (2006.01) | |
| *H01M 10/052* | (2010.01) | |

(52) U.S. Cl.
CPC ....... *H01M 4/0445* (2013.01); *H01M 4/1395* (2013.01); *H01M 4/382* (2013.01); *H01M 10/052* (2013.01)

(58) Field of Classification Search
CPC .. H01M 4/0445; H01M 4/1395; H01M 4/382; H01M 10/052; H01M 4/134; H01M 4/483; H01M 4/0447; H01M 2004/027; H01M 10/0525; H01M 2/10; H01M 4/04; H01M 4/38; H01M 2/1016; Y02E 60/10
See application file for complete search history.

(56) References Cited

U.S. PATENT DOCUMENTS

| | | | |
|---|---|---|---|
| 4,119,767 A * | 10/1978 | Beck ..................... | H01M 10/06 429/105 |
| 6,329,789 B1 | 12/2001 | Gavrilov et al. | |
| 2002/0012846 A1 * | 1/2002 | Skotheim ............. | H01M 4/387 429/231.95 |
| 2009/0313814 A1 | 12/2009 | Tsuchida | |
| 2011/0254508 A1 * | 10/2011 | Sakakibara ......... | H01M 10/441 320/118 |
| 2013/0004852 A1 | 1/2013 | Visco et al. | |
| 2015/0311501 A1 | 10/2015 | Tenzer et al. | |

FOREIGN PATENT DOCUMENTS

| | | |
|---|---|---|
| CN | 104810557 A | 7/2015 |
| CN | 104810565 A | 7/2015 |
| CN | 105914394 A | 8/2016 |
| CN | 106450543 A | 2/2017 |
| CN | 106569147 A | 4/2017 |
| EP | 3471193 A1 | 4/2019 |
| JP | 7-169460 A | 7/1995 |
| JP | 2004-165097 A | 6/2004 |
| JP | 3578015 B2 | 7/2004 |
| JP | 2006-244973 A | 9/2006 |
| JP | 2009-152030 A | 7/2009 |
| JP | 4465756 B2 | 5/2010 |
| JP | 2014-164882 A | 9/2014 |
| KR | 10-2005-0041093 A | 5/2005 |
| KR | 10-0639431 B1 | 10/2006 |
| KR | 10-2007-0082379 A | 8/2007 |
| KR | 10-2009-0029288 A | 3/2009 |
| KR | 10-2009-0033666 A | 4/2009 |
| KR | 10-1354481 B1 | 1/2014 |
| WO | WO 02/095849 A2 | 11/2002 |

OTHER PUBLICATIONS

International Search Report (PCT/ISA/210) issued in PCT/KR2018/007393, dated Feb. 21, 2019.
Kazyak et al., "Improved Cycle Life and Stability of Lithium Metal Anodes through Ultrathin Atomic Layer Deposition Surface Treatments," Chem. Mater. 2015, 27, 6457-6462.
Kozen et al., "Next-Generation Lithium Metal Anode Engineering via Atomic Layer Deposition," American Chemical Society vol. 9 No. 6, 2015, 5884-5892.

* cited by examiner

*Primary Examiner* — Muhammad S Siddiquee
(74) *Attorney, Agent, or Firm* — Birch, Stewart, Kolasch & Birch, LLP

(57) ABSTRACT

A method of manufacturing a secondary battery using lithium metal as a negative electrode, and more particularly, a method of manufacturing a secondary battery capable of removing an oxide film formed on a lithium metal by performing some initial discharges during the initial period of the activation process to thereby improve the cycling performance of the battery by allowing lithium to be uniformly precipitated. The result minimizes the reduction of ion conductivity by removing the oxide film formed on the surface of the lithium metal through the initial partial discharge and improves the battery cycle performance since the precipitation reaction of lithium becomes uniform.

12 Claims, 5 Drawing Sheets

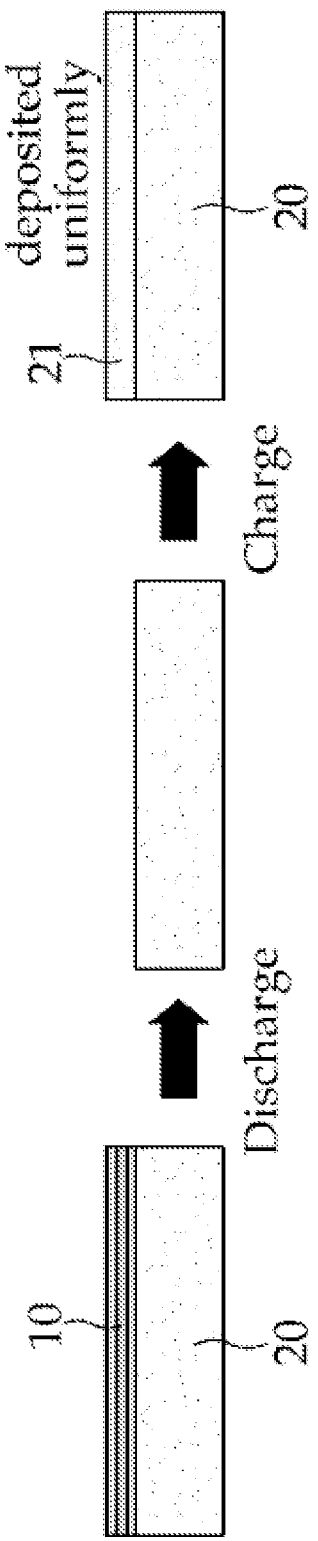

METHOD FOR MANUFACTURING SECONDARY BATTERY USING LITHIUM METAL AS NEGATIVE ELECTRODE

TECHNICAL FIELD

The present application claims the benefit of priority based on Korean Patent Application No. 10-2017-0087578 filed on Jul. 11, 2017, and the entire contents of the Korean patent application are incorporated herein by reference.

The present invention relates to a method of manufacturing a secondary battery using lithium metal as a negative electrode, and more particularly, to a method of manufacturing a secondary battery capable of removing an oxide film formed on a lithium metal by performing some initial discharges during the initial period of the activation process to thereby improve the cycling performance of the battery by allowing lithium to be uniformly precipitated.

BACKGROUND ART

Recently, interest in energy storage technology is increasing. As the application fields of the technology are expanded to cell phones, camcorders, notebook PCs, and electric vehicles, efforts for research and development of electrochemical devices are becoming more concrete.

The electrochemical device is one of the most remarkable fields in this respect, and among these, the development of a rechargeable secondary battery has become a focus of attention. In recent years, research and development about a new electrode and battery design have been progressed in order to improve capacity density and specific energy in developing such a secondary battery.

Among the currently applied secondary batteries, the lithium secondary battery developed in the early 1990s is under the spotlight because of its advantages such as higher operating voltage and much higher energy density than conventional batteries such as Ni-MH, Ni—Cd, and sulfuric acid-lead batteries which use an aqueous electrolyte solution.

Lithium metal having a low standard hydrogen potential (−3.04V vs. SHE) and a high theoretical capacity (3860 mAh/g) has been considered as a negative electrode material that can achieve 10 times higher energy density than conventional graphite negative electrode (theoretical capacity: 372 mAh/g). However, in order to use lithium metal as a negative electrode for a lithium ion secondary battery, a poor life cycle and safety of the lithium metal may be a problem, which is related to the strong reactivity of the lithium metal.

When lithium metal is exposed to the atmosphere, an oxide film such as $Li_2CO_3$, $Li_2O$, LiOH, or the like is formed depending on the kind of gas present in the air on the surface. Such an oxide film not only makes the current density on the surface uneven and reduces the surface area required for dissolution and deposition of lithium, but also acts as a resistive layer to thereby reduce ionic conductivity.

The form of deposited lithium is related to the charge/discharge current density, the type of electrolyte, and the growth of lithium in the form of dendrite, moss and sphere. Part of the lithium that is growing in the form of dendrites is broken during the discharge and dead lithium is formed, which is not electrochemically chargeable and dischargeable, but has a chemically strong reactivity. Due to the formation of such dead lithium, reversible charging and discharging of lithium is difficult when lithium metal is used as the negative electrode of the lithium ion secondary battery, and as a result, the lifespan characteristic of the electrode of lithium metal is poor and the thermal stability is also poor in the non-aqueous electrolyte.

Therefore, although it is necessary to remove the oxide film as described above, it is extremely difficult to remove only the oxide film formed by any pretreatment due to the strong reactivity of the lithium metal. Therefore, it is necessary to develop a technology for removing an oxide film formed on the surface of lithium metal.

DISCLOSURE

Technical Problem

An object of the present invention is to provide a manufacturing method for removing an oxide film formed on the surface of a lithium metal in manufacturing a lithium secondary battery.

Another object of the present invention is to provide a method for manufacturing a lithium secondary battery in which cycle characteristics are improved by removing an oxide film formed on the surface of lithium metal.

Technical Solution

According to an aspect of the present invention, there is provided a manufacturing method of a secondary battery, including providing a secondary battery including a negative electrode, which negative electrode includes a lithium metal layer, wherein an oxide film is present on a surface of the lithium metal layer, and removing the oxide film on the surface of the lithium metal layer by performing a partial discharge before an initial charging of an activation process.

According to an example of the present invention, a discharge current density during the partial discharge may be 0.01 to 3 mA/cm$^2$.

According to an example of the present invention, a discharge capacity during the partial discharge may be set in consideration of an amount of lithium that can be received by a positive electrode of the secondary battery.

According to an example of the present invention, the secondary battery further includes a positive electrode, the positive electrode including a positive electrode active material, which may be one or two selected from a lithium metal oxide and a metal oxide not containing lithium.

Herein, when the positive electrode includes the metal oxide not containing lithium, the metal oxide not containing lithium may be at least one selected from the group consisting of vanadium oxide, manganese oxide, nickel oxide, cobalt oxide, niobium oxide, and iron phosphate.

According to an example of the present invention, an initial electric current density of the initial charging may be 0.01 to 2 mA/cm$^2$.

Further, according to the present invention, there is provided a lithium secondary battery manufactured by the method of any of the above methods, as well as a battery module including the lithium secondary battery as a unit cell, a battery pack including the module and a device including the battery pack as a power source.

Advantageous Effects

The present invention has an effect of minimizing a decrease in ion conductivity by removing an oxide film formed on the surface of lithium metal through an initial partial discharge during an activation process of a lithium secondary battery using lithium metal as a negative electrode.

The present invention has another effect of reducing variation in cell performance due to storage and manufacturing facilities of lithium metal by removing the oxide film of lithium metal.

In addition, the secondary battery using the lithium metal as the negative electrode manufactured by the manufacturing method of the present invention has an effect of improving the battery cycle performance because the precipitation reaction of lithium is uniform.

Further, according to the manufacturing method of the present invention, the range of selection of the positive electrode material is widened, which is advantageous in enhancing the price competitiveness.

BRIEF DESCRIPTION OF THE DRAWINGS

FIG. 8 is a schematic diagram of the activation process of the present invention.

DETAILED DESCRIPTION OF THE PREFERRED EMBODIMENTS

Hereinafter, the present invention will be described in detail. The terms and words used in the present specification and claims should not be construed as limited to ordinary or dictionary terms and the inventor may properly define the concept of the terms to describe its invention in the best possible way. The terms used here should be construed as meaning and concept consistent with the technical idea of the present invention.

The present invention relates to a method for producing a secondary battery using a lithium metal as a negative electrode, wherein the battery is partially discharged before the initial charge in the activation process.

A general secondary battery manufacturing process will be briefly described. First, a slurry containing a positive electrode active material and a negative electrode active material is applied to each current collector and then rolled or laminated together with a separator as an insulator to prepare an electrode assembly. Then the electrode assembly is inserted into a battery case.

Thereafter, the process of injecting the electrolyte solution into the battery case is performed and following necessary processes such as a sealing are performed, then an aging process for electrolyte impregnation or the like, which exposes the electrolyte to a constant temperature or humidity environment, is performed so that the electrolytic nucleus components of the secondary battery are mixed and permeated.

When the above process is completed, a formation process of charging/discharging the secondary battery is performed. The formation process stabilizes the cell structure and makes it possible to use the cell structure. That is, the formation process may include an activation step and a degassing step, and may also include a detection of a defective battery generated during other aging processes.

The present invention improves battery cycle performance by uniformly precipitating lithium by removing the oxide film formed naturally on the surface of the lithium metal by changing the process conditions of the activation step in a series of manufacturing processes as described above. Specifically, the oxide film on the lithium metal surface is removed by performing some discharges before charging in the activation process.

Figure 7:
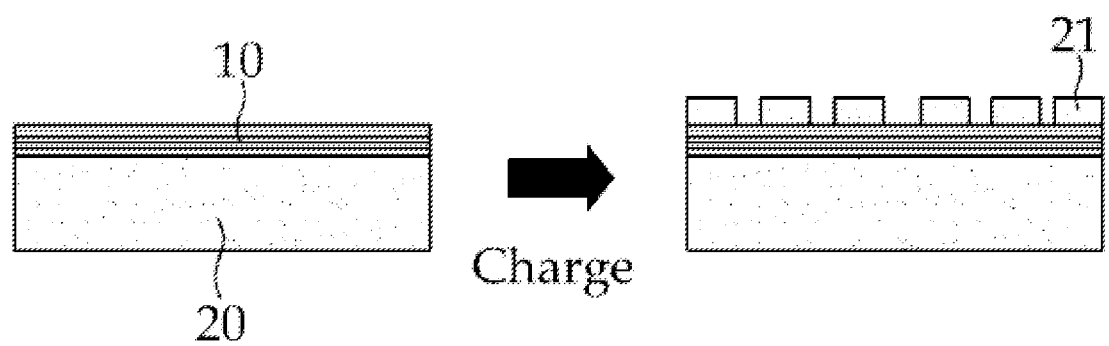
FIG. 7 is a schematic diagram of a conventional activation process.

FIG. 7 shows a conventional activation process. In the prior art, since the activation process is performed without removing the native oxide film 10 formed on the surface of the lithium metal layer 20, lithium 21 is unevenly precipitated due to the native oxide film.

FIG. 8 illustrates an activation process according to an example of the present invention. In the present invention, the natural oxide film 10 formed on the surface of the lithium metal layer 20 is removed by performing the initial partial discharge, and then when the charging is performed, the lithium 21 is uniformly precipitated.

According to a preferred example of the present invention, the discharge current density at the time of the partial discharge is 0.01 to 3 mA/cm2, more preferably 0.05 to 2.5 mA/cm2, most preferably 0.1 to 2 mA/cm2. If the discharge current density is less than 0.01 mA/cm2, it is difficult to achieve the intended purpose of the present invention. If the discharge current density is more than 3 mA/cm2, the current density becomes uneven and it is difficult to uniformly remove the oxide layer by discharge.

The discharge capacity at the time of partial discharge can be set in consideration of the amount of lithium that can be received by the positive electrode.

In the present invention, after the initial partial discharge, the initial current density of the initial charge is preferably 0.01 to 2 mA/cm2, more preferably 0.05 to 1.5 mA/cm2, and most preferably 0.1 to 1 mA/cm2. If the initial current density of the initial charge is less than 0.01 mA/cm2, the effect of the activation process is lost. If the initial current density of the initial charge exceeds 2 mA/cm2, non-uniform reaction occurs due to delocalization of current.

In the present invention, the positive electrode is prepared by applying an electrode mixture, which is a mixture of a positive electrode active material, a conductive material and a binder, on a positive electrode current collector, followed by applying a drying operation thereto, and if necessary, a filler may be further added to the mixture.

The positive electrode current collector generally has a thickness of 3 to 500 μm. The positive electrode current collector is not particularly limited as long as it has high conductivity without causing chemical change in the battery, and examples thereof include stainless steel, aluminum, nickel, titanium, sintered carbon, or an output generated by treating the surface of aluminum or stainless steel with carbon, nickel, titanium, silver, or the like. The current collector may have fine irregularities on the surface thereof to increase the adhesive force of the positive electrode active material, and various forms such as a film, a sheet, a foil, a net, a porous body, a foam, and a nonwoven fabric are possible.

The conductive material is usually added in an amount of 1 to 50 wt % based on the total weight of the mixture including the positive electrode active material. Such a conductive material is not particularly limited as long as it has electrical conductivity without causing a chemical change in the battery, and examples thereof include graphite such as natural graphite and artificial graphite; carbon blacks such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is a component that assists in bonding of the active material and the conductive material and bonding to the current collector, and is usually added in an amount of 1 to 50 wt % based on the total weight of the mixture including the positive electrode active material. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for inhibiting expansion of a positive electrode, and is not particularly limited as long as it is a fibrous material without causing a chemical change in the battery. Examples of the filler include olefin polymers such as polyethylene and polypropylene; fibrous materials such as glass fibers and carbon fibers.

The positive electrode active material used in the method for manufacturing a secondary battery of the present invention is one or two selected from lithium metal oxides and metal oxides that do not contain lithium. Lithium metal oxide, which is used as a positive electrode active material, is capable of initial discharge. However, it is also possible to mix a metal oxide which does not contain lithium, which is inexpensive and safe, to some positive electrodes or to apply 100% of a metal oxide which does not contain lithium. At this time, the metal oxides not containing lithium include vanadium oxide, manganese oxide, nickel oxide, cobalt oxide, niobium oxide, iron phosphate and the like.

The negative electrode of the present invention is produced by attaching a lithium metal on a negative electrode current collector. The negative electrode current collector is generally made to have a thickness of 3 to 500 µm. The negative electrode current collector is not particularly limited as long as it has conductivity without causing chemical changes in the battery, and examples thereof include copper, stainless steel, aluminum, nickel, titanium, sintered carbon, an output generated by treating the surface of copper or stainless steel with carbon, nickel, titanium, silver or the like, aluminum-cadmium alloy, or the like. In addition, as in the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

An insulating thin film interposed between a positive electrode and a negative electrode and having high ion permeability and mechanical strength is used as the separation film. The pore diameter of the separator is generally 0.01 to 10 µm and the thickness is generally 5 to 300 µm. Examples of such a separation film include olefin-based polymers such as polypropylene, which is chemically resistant and hydrophobic; a sheet or a nonwoven fabric made of glass fiber, polyethylene or the like. When a solid electrolyte such as a polymer is used as the electrolyte, the solid electrolyte may also serve as a separation film.

The battery case may be a metal can, or a pouch type battery case of a laminate sheet including a resin layer and a metal layer, and more specifically, a pouch type battery case. As described above, since the pouch type battery case is difficult to keep the external shape of the battery at a constant force, the region that is not activated during the activation process is continuously activated as the cycle is proceeded at the high voltage, which generates gas which makes the pouch swollen to be bent or makes the gases trapped between electrodes, and the gas interferes with the uniform and smooth reaction of the electrodes. Therefore, more significant effects can be shown when the manufacturing method of the secondary battery according to the present invention is applied.

The electrolyte salt included in the nonaqueous electrolyte solution which can be used in the present invention is a lithium salt. Examples of the non-aqueous electrolyte include non-aqueous organic solvents, organic solid electrolytes, inorganic solid electrolytes, and the like.

Examples of the non-aqueous organic solvent include N-methyl-2-pyrrolidinone, propylene carbonate, ethylene carbonate, butylenecarbonate, dimethyl carbonate, diethyl carbonate, gamma-butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, and ethyl propionate.

Examples of the organic solid electrolyte include polymers such as a polyethylene derivative, a polyethylene oxide derivative, a polypropylene oxide derivative, a phosphate ester polymer, a poly agitation lysine, a polyester sulfide, a polyvinyl alcohol, a polyvinylidene fluoride, and an ionic dissociation group.

Examples of the inorganic solid electrolyte include Li nitrides such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, halides, sulfates and the like.

The lithium salt is a substance which is soluble in the non-aqueous electrolyte and some examples of the lithium salt include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium 4-phenylborate, imide, and the like.

The lithium salt-containing nonaqueous electrolyte may further contain, for the purpose of improving charge/discharge characteristics, flame retardancy, etc., for example, pyridine, triethylphosphite, triethanolamine, cyclic ether, ethylenediamine, glyme, n-glyme, hexaphosphoric triamide, nitrobenzene derivatives, sulfur, quinone imine dyes, N-substituted oxazolidinones, N,N-substituted imidazolidines, ethylene glycol dialkyl ethers, ammonium salts, pyrroles, 2-methoxyethanol, aluminum trichloride, etc. In some cases, a halogen-containing solvent such as carbon tetrachloride or ethylene trifluoride may be further added to impart nonflammability, or a carbon dioxide gas may be further added to improve the high-temperature storage characteristics. Further, FEC (Fluoro-Ethylene Carbonate, PRS (Propene sultone), and the like may also be added.

In one specific example, a lithium salt such as $LiPF_6$, $LiClO_4$, $LiBF_4$, $LiN(SO_2CF_3)_2$, or the like may be added to a mixed solvent of a cyclic carbonate of EC or PC which is a high-dielectric solvent and a linear carbonate of DEC, DMC or EMC to thereby prepare a non-aqueous electrolyte containing a lithium salt.

After the nonaqueous electrolytic solution is injected into the battery container, the battery container is sealed. When the battery is a pouch type, an adhesive layer made of unstretched polypropylene (CPP) or polypropylene (PP) is formed for adhesion between the lower surface of the upper pouch and the upper surface of the lower pouch of the battery case, to thereby be bonded by heat fusion, etc.

A preliminary battery, in which a nonaqueous electrolyte is injected into a battery container accommodating an electrode assembly and is sealed, is subjected to an activation step of initial charging to activate the electrode active material and form an SEI film on the electrode surface. Further, an aging step may be further performed so that the electrolyte injected before the activation step can sufficiently penetrate the electrode and the separator.

As described above, the present invention initiates an initial charge after a partial discharge in the activation step. In the present invention, after the initial partial discharge, the initial current density of the initial charge is preferably 0.01 to 2 mA/cm2, more preferably 0.05 to 1.5 mA/cm2, and most preferably 0.1 to 1 mA/cm2.

The present invention provides a battery module including the secondary battery as a unit cell, a battery pack including the battery module, and a device including the battery pack as a power source.

At this time, specific examples of the device include a power tool which is powered by an electric motor and moves; electric vehicles including an electric vehicle (EV), a hybrid electric vehicle (HEV), a plug-in hybrid electric vehicle (PHEV), and the like; electric motorcycles including an electric bike (E-bike) and an electric scooter (E-scooter); an electric golf cart; and a power storage system, but the present invention is not limited to these examples.

Hereinafter, the present invention will be described in detail with reference to examples. However, the examples according to the present invention can be modified into various other forms, and the scope of the present invention should not be construed as being limited to the above-described examples. Examples of the present invention are provided to more fully describe the present invention to those skilled in the art.

EXAMPLE 1

(1) Preparation of Positive Electrode 96 wt % of $LiNiCoMnO_2$, 2 wt % of Denka black (conductive material) and 2 wt % of PVDF (polyvinylidene fluoride) were added to NMP(N-Methyl-2-Pyrrolidone) as positive electrode active materials to thereby prepare a positive electrode mixture slurry. The positive electrode mixture slurry was coated on one surface of the aluminum current collector to a thickness of 65 μm, dried and rolled, and then punched to a predetermined size to produce a positive electrode.

(2) Preparation of Negative Electrode

Lithium metal negative electrode was prepared by attaching lithium metal (20 μm, rolled lithium) foil, as it was when received, on one surface of the cooper collector.

(3) Preparation of Lithium Secondary Battery

A coin cell having a polypropylene porous film interposed between the positive electrode and the negative electrode was prepared. An electrolytic solution in which 1M $LiPF_6$ was dissolved was injected into a solvent in which ethylene carbonate (EC) and ethyl methyl carbonate (DEC) were mixed at a volume ratio of 30:70. Then, the battery was partially discharged under the conditions shown in Table 1, and then initial charging (CC/CV, current density 1.2 mA/cm2, 4.25 V cut off) was performed to produce a lithium secondary battery.

EXAMPLES 2 to 12

A lithium secondary battery was produced in the same manner as in Example 1, except that some discharging conditions were changed as shown in Table 1 during the activation process.

Comparative Example

A lithium secondary battery was manufactured in the same manner as in Example 1, except that a part of the discharging process was not performed before the initial charging in the activation process.

Experimental Example 1. Observation of Lithium Precipitation After Activation (SEM)

In the process of manufacturing the lithium secondary battery of Example 8 and Comparative Example, after the activation process, the lithium precipitation on the lithium metal surface by SEM is shown in FIGS. 1 to 6.

Figure 1:
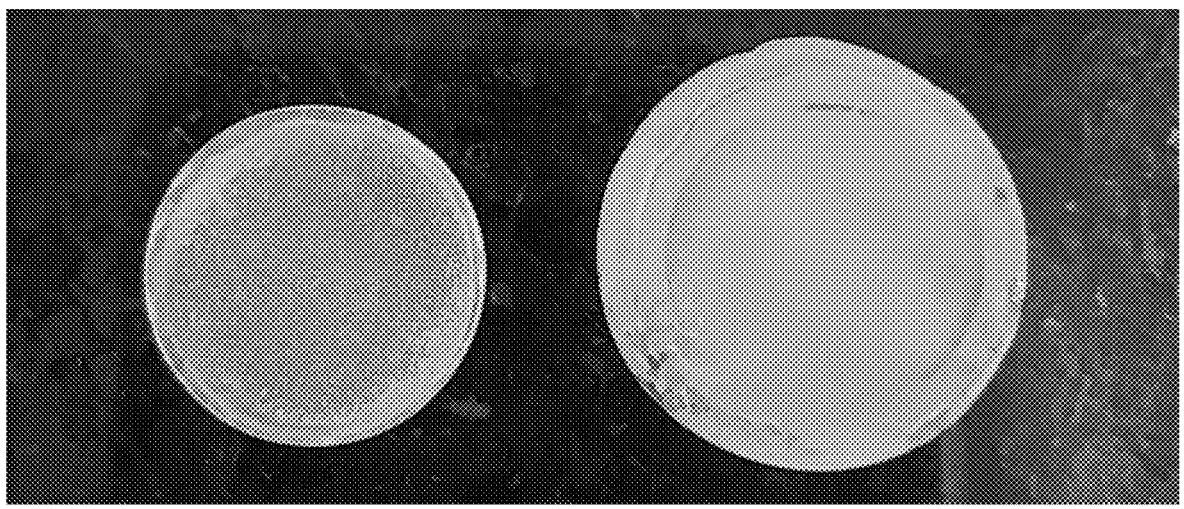
FIGS. 1 and 2 are photographs of a lithium metal surface after completion of the activation process in Example 8 and Comparative Example 1.
Figure 2:
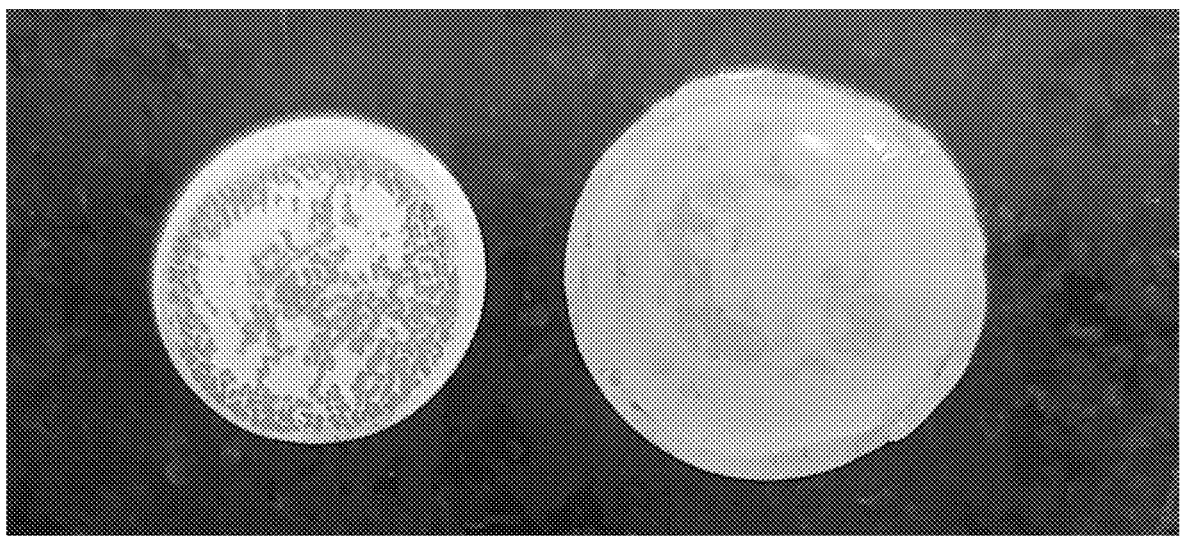
Figure 3:
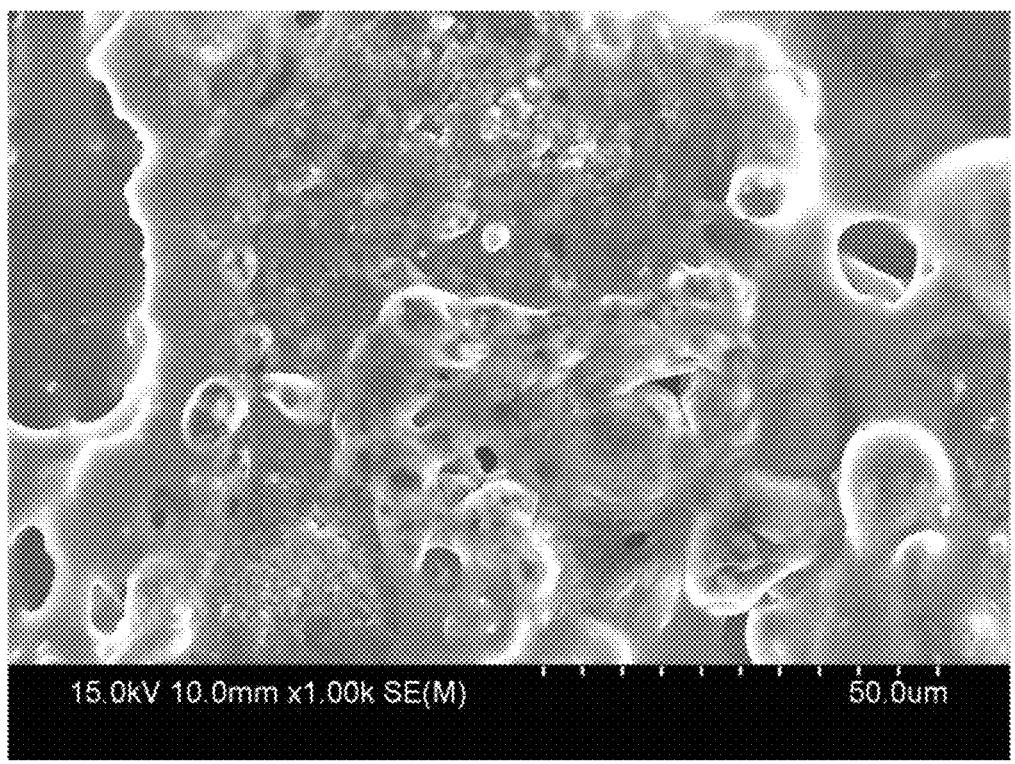
FIGS. 3 and 4 are SEM photographs of the lithium metal surface magnified 1000 times after the activation process in Example 8 and Comparative Example 1.
Figure 4:
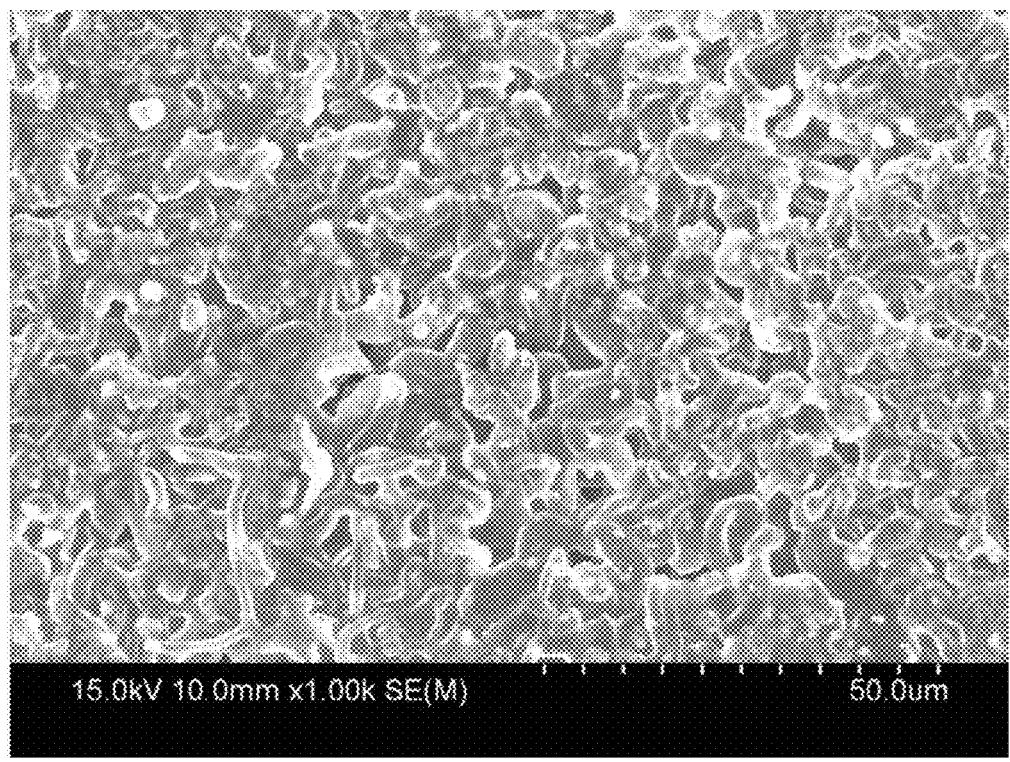
Figure 5:
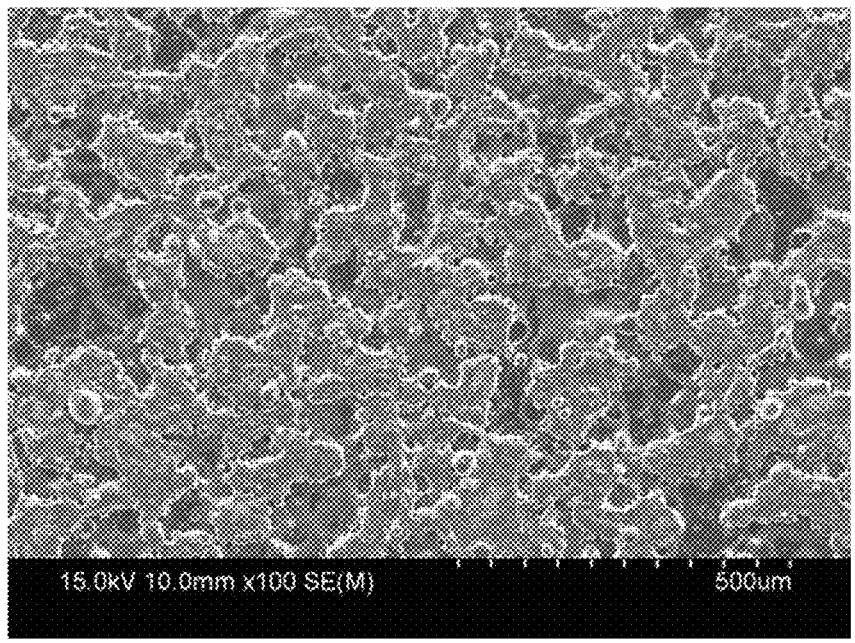
FIGS. 5 and 6 are SEM photographs of the lithium metal surface magnified 1000 times after the activation process is completed in Example 8 and Comparative Example 1.
Figure 6:
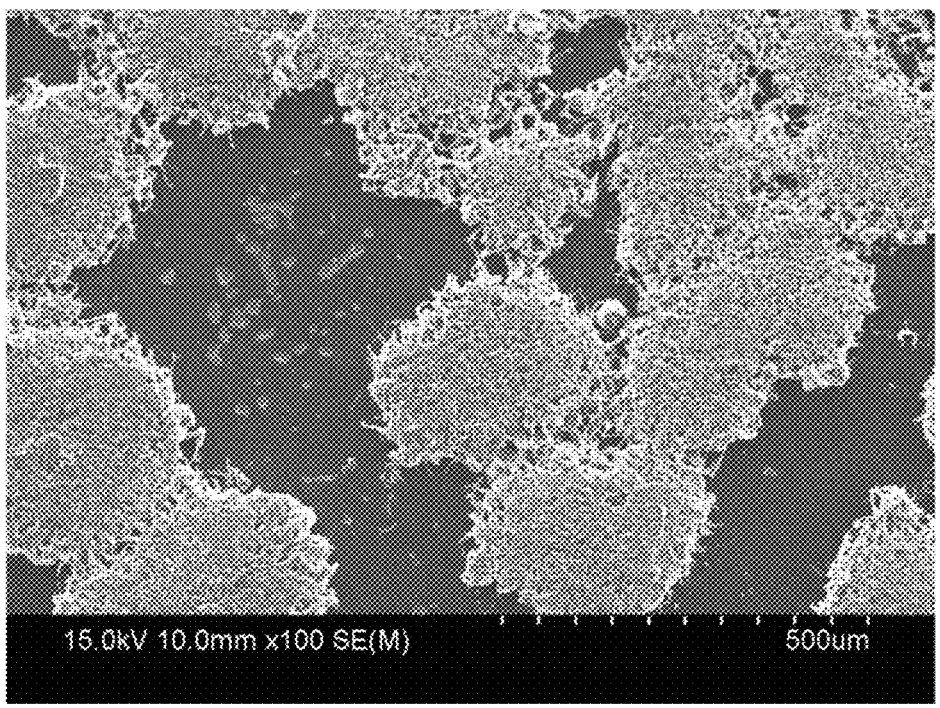

FIGS. 1, 3 and 5 show Example 8 and FIG. 2, FIG. 4 and FIG. 6 show the lithium precipitation shapes of the comparative examples. It is seen that lithium is uniformly precipitated in Example 8 compared to the comparative example.

Experimental Example 2. Capacity Retention Rate Measurement

The lithium secondary batteries of Examples 1 to 12 and Comparative Examples were charged at 0.3 C to 4.25 under constant current/constant voltage (CC/CV) conditions at 45 and then discharged at 0.5 C to 3 V under constant current (CC) condition, and the discharge capacity was measured. This was repeated with 1 to 50 cycles, and the measured capacity retention rates are shown in Table 1.

TABLE 1

| | Activation condition | | | |
|---|---|---|---|---|
| | Discharge current density (mA/cm$^2$) | Discharge capacity (mAh) | Initial charge capacity (mAh) | Capacity retention rate (% @50 cycle) |
| Example 1 | 0.1 | 0.1 | 2.1 | 67 |
| Example 2 | | 1 | 3 | 70 |
| Example 3 | 0.5 | 0.1 | 2.1 | 68 |
| Example 4 | | 1 | 3 | 73 |
| Example 5 | 1 | 0.1 | 2.1 | 70 |
| Example 6 | | 1 | 3 | 72 |
| Example 7 | 2 | 0.1 | 2.1 | 75 |
| Example 8 | | 1 | 3 | 83 |
| Example 9 | 0.01 | 0.1 | 2.1 | 65 |
| Example 10 | | 1 | 3 | 60 |
| Example 11 | 3 | 0.1 | 2.1 | 66 |
| Example 12 | | 1 | 3 | 67 |
| Comparative example | — | — | 2 | 59 |

As can be seen from Table 1, the capacity retention rates of the battery according to the Examples are much better than that of the Comparative Example. This is because the activated oxide film was partially discharged before the initial charge at the activation process so that the natural oxide film on the lithium metal surface was removed and the lithium precipitation reaction became uniform to thereby improve the cycle performance.

The invention claimed is:

1. A manufacturing method of a secondary battery, comprising:
    providing a secondary battery comprising a negative electrode, said negative electrode comprising a lithium metal layer, wherein an oxide film is present on a surface of the lithium metal layer; and
    removing the oxide film on the surface of the lithium metal layer by performing a partial discharge before an initial charging of an activation process,
    wherein a discharge current density during the partial discharge is 0.01 mA/cm$^2$ to 3 mA/cm$^2$, and
    wherein an initial electric current density of the initial charging is 0.01 mA/cm$^2$ to 2 mA/cm$^2$.

2. The method of claim 1, wherein a discharge capacity during the partial discharge is set in consideration of an amount of lithium that can be received by a positive electrode of the secondary battery.

3. The method of claim 1, wherein the secondary battery further comprises a positive electrode, said positive electrode comprising a positive electrode active material, which is one or two selected from a lithium metal oxide and a metal oxide not containing lithium.

4. The method of claim 3, wherein the positive electrode material is the metal oxide not containing lithium, which is at least one selected from the group consisting of vanadium oxide, manganese oxide, nickel oxide, cobalt oxide, niobium oxide, and iron phosphate.

5. A lithium secondary battery produced by the method of claim 1.

6. A battery module comprising the lithium secondary battery according to claim 5 as a unit cell.

7. A battery pack comprising the battery module according to claim 6.

8. A device comprising the battery pack according to claim 7 as a power source.

9. The method of claim 1, further comprising:
    after removing the oxide film, performing charging of the activation process to uniformly precipitate lithium on the lithium metal layer.

10. The method of claim 3, wherein the positive electrode material is the lithium metal oxide.

11. The method of claim 3, wherein the positive electrode material is the metal oxide not containing lithium.

12. The method of claim 3, wherein the positive electrode material comprises the lithium metal oxide and the metal oxide not containing lithium.

* * * * *